(12) United States Patent
Chong et al.

(10) Patent No.: US 12,730,660 B1
(45) Date of Patent: Sep. 8, 2026

(54) SHARED TRANSLATION PAGE TABLES FOR OWNERSHIP TRANSFER

(71) Applicant: Amazon Technologies, Inc., Seattle, WA (US)

(72) Inventors: Nathan Yong Seng Chong, Ponte Vedra, FL (US); Dominic Phillip Mulligan, Cambridge (GB); Konrad Lee Slind, Richfield, MN (US); Zhong Sheng Hu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 32 days.

(21) Appl. No.: 18/065,291

(22) Filed: Dec. 13, 2022

(51) Int. Cl.
*G06F 9/455* (2018.01)
*G06F 12/0891* (2016.01)
*G06F 12/1009* (2016.01)

(52) U.S. Cl.
CPC ...... *G06F 9/45558* (2013.01); *G06F 12/0891* (2013.01); *G06F 12/1009* (2013.01); *G06F 2009/45583* (2013.01); *G06F 2212/152* (2013.01); *G06F 2212/683* (2013.01)

(58) Field of Classification Search
CPC ............. G06F 9/45558; G06F 12/0891; G06F 12/1009; G06F 2009/45583; G06F 2212/152; G06F 2212/683
See application file for complete search history.

(56) References Cited

U.S. PATENT DOCUMENTS

2017/0242623 A1* 8/2017 Jung .................... G06F 12/0866
2021/0209025 A1* 7/2021 Koker ................. G06F 12/0804
2022/0276968 A1* 9/2022 Zuo ......................... G06F 9/545

OTHER PUBLICATIONS

Li et al., A Secure and Formally Verified Linux KVM Hypervisor, 2021, IEEE, pp. 1782-1799 (Year: 2011).*
ARM Developer, “Arm® Architecture Reference Manual for A-profile architecture,” ARM DDI 0487I.a (ID081822), Aug. 19, 2022, Chapter D8: The AArch64 Virtual Memory System Architecture, Sections D8.1-D8.3, pp. 5080-5131, URL: https://developer.arm.com/documentation/ddi0487/ia/?lang=en [accessed Jun. 5, 2023].
Edge, J., “KVM for Android,” Nov. 11, 2020, pp. 1-5, URL: https://lwn.net/Articles/836693/ [accessed Jun. 5, 2023].
Li, S. et al., “Formally Verified Memory Protection for a Commodity Multiprocessor Hypervisor,” Proc. of the 30th USENIX Security Symposium, Aug. 2021, pp. 3953-3970, URL: https://www.usenix.org/system/files/sec21-li-shih-wei.pdf.

* cited by examiner

*Primary Examiner* — Gary W. Cygiel
(74) *Attorney, Agent, or Firm* — Weaver Austin Villeneuve & Sampson LLP

(57) ABSTRACT

Shared translation page tables are used for ownership transfer between software components having different execution privilege levels in a layered design. Each page table entry in a page table for the last translation level can include an ownership indicator to indicate the ownership of a physical page being mapped by the given page table entry by one or more software components. A single page table walk of the shared translation page tables can be performed to change the ownership of the physical page from one software component to another software component by updating the ownership indicator in a page table entry corresponding to that physical page.

20 Claims, 8 Drawing Sheets

| Attributes 500a | Ownership Indicator 500b | . . . . | Address 500c | . . . . |
|---|---|---|---|---|

SHARED TRANSLATION PAGE TABLES FOR OWNERSHIP TRANSFER

BACKGROUND

In computing systems with virtualized memory, different layers of software can execute at different exception levels that are associated with different privileges. As an example, user applications can execute at the base privilege level with the least privileges, operating system kernels can execute at a first privilege level with higher privileges than the base privilege level, hypervisors can execute at a second privilege level with higher privileges than the first privilege level, and a trusted secure component such as a secure monitor can execute at a third privilege level with higher privileges than the second privilege level.

BRIEF DESCRIPTION OF THE DRAWINGS

Various embodiments in accordance with the present disclosure will be described with reference to the drawings, in which.

DETAILED DESCRIPTION

Figure 1:
FIG. 1 illustrates a simplified block diagram of a computing system that can support virtual memory management.
Figure 1:
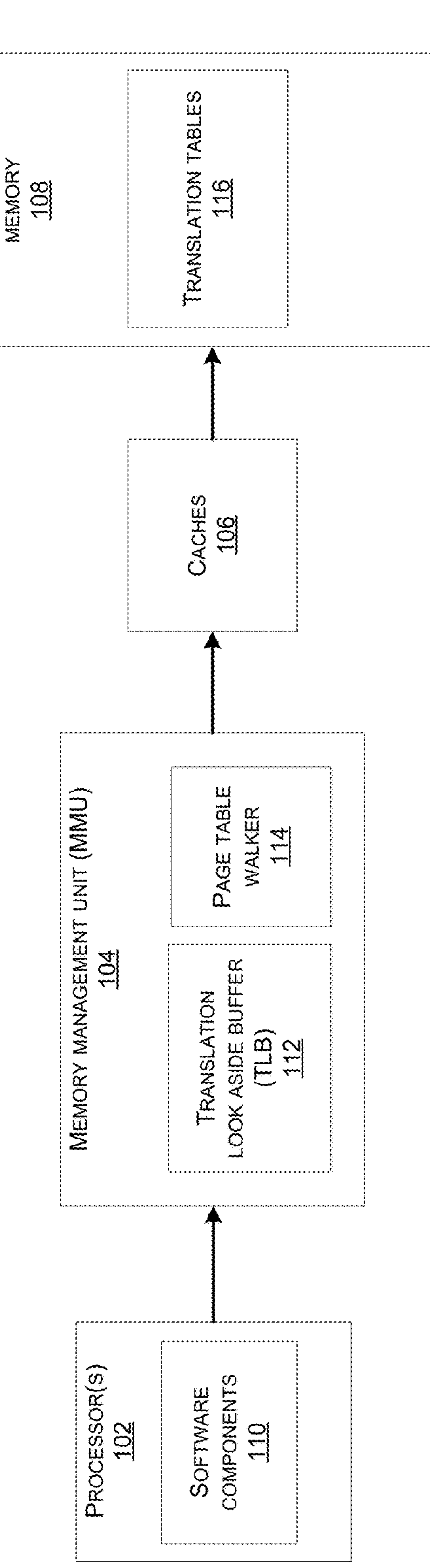

In some computing systems, a privileged software component (e.g., an operating system or a hypervisor) may be implemented as a small, trusted core component that can service a larger untrusted component. The computing systems can provide hardware support to execute the trusted core component at a more privileged level than the untrusted component. As an example, the trusted core of a hypervisor can execute at a higher privilege level than the untrusted component. The layered separation can provide security advantages by minimizing the size of the trusted core component. In some architectures, the privilege levels can be referred to as exception levels.

In some implementations, layered separation may include maintaining separate page table mappings for each privilege level. A page table mapping is typically given as a tree data structure that is managed by the software, and used by the hardware to automatically translate between address spaces with permissions checking. Generally, to reduce complexity in a layered design, mappings for the different privilege levels can be implemented to be compatible in some ways. For example, both the mappings can have identity mappings, or can use the same fixed offset, to allow access to a block of physical memory using the same address from the point of view of each software component. This simplification can avoid performing forward and reverse mappings to determine how a physical block of memory can be mapped into each software component's virtual view of memory.

In most implementations, the more privileged core component has to maintain two separate page table mappings (e.g., one for the trusted core and another one for the larger untrusted component), which can incur a storage cost as well as a performance cost when the mappings are updated. Ownership transfer of a physical page from one software component to another can involve multiple steps. For example, a page table walk of the source page table may be performed first which can involve multiple load operations. Next, the page table entry associated with the physical page may need to be updated using a write operation to invalidate the page table entry. In some cases, a translation lookaside buffer (TLB) invalidate sequence may be issued to ensure that the cached translations are properly flushed. Then a page table walk of the destination page table may be performed which may also require multiple load operations, as well as additional cost associated with allocations of pages for intermediate page tables. Finally, the page table entry associated with the physical page may need to be updated using another write operation to create a valid page table entry. In some cases, the page table walks for both the source and the destination page tables may require locking, which can further impact the system performance. Thus, the transfer of ownership of the physical pages using this process can be costly due to redundancy in the page table walks on both the source and the destination sides to perform the same translations.

Techniques described herein can be used to perform the ownership transfer between two software components having different privileges in the layered design using a single page table mapping shared between both the software components. Ownership of a physical memory page or a physical memory block by a software component can imply that the given physical memory page or the physical memory block is allocated to that software component, or access to the given physical memory page or the physical memory block by that software component is allowed. In some embodiments, a page table entry (PTE) associated with each physical page may include an indication about the ownership of that physical page, which can be used to determine whether a software component has access to that physical page. As an example, the PTE may include an ownership indicator to indicate the current ownership of the physical page (e.g., by a first software component having higher execution privileges, a second software component having next lower execution privileges, or both, etc.). Having shared page table mappings between two software components can allow a single page table walk, and an atomic update of the PTE to change the ownership indicator bits between the two software components. This can be followed by a TLB invalidate sequence to invalidate a TLB entry corresponding to the PTE with the changed ownership.

Thus, the use of a shared page table mapping between the software components can reduce the page table storage as well as improve performance since only a single page table walk may need to be performed for memory accesses. In some implementations, the ownership indicator may include separate ownership indicator bits to indicate the corresponding ownership of each privilege level. Some embodiments can be used to enforce a strong security property when no sharing between the privilege levels is allowed by ensuring that the ownership indicator bits are indicating at most a single owner for memory accesses, e.g., only one of the ownership indicator bits is enabled at a time. In such cases, if both the ownership indicator bits are set, an alert (e.g., a fault or another software-visible error) can be generated when performing the ownership transfer to indicate ownership of the physical page by more than one software component, which can provide an extra layer of security.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates a simplified block diagram of a computing system 100 that can support virtual memory management. The computing system 100 may include one or more processors 102, a memory management unit (MMU) 104, caches 106, and memory 108.

The processors 102 may be configured to execute various software components 110 comprising user applications, operating systems (e.g., guest operating systems, kernels), hypervisor, etc. Generally, software components executing on the processors 102 may issue a virtual memory address to access a location in the memory 108. The MMU 104 may be configured to translate virtual addresses (VAs) used by the software components to physical addresses (PAs) that can be used to access the memory 108. The VAs can be translated to the PAs using translation tables 116 that are stored in the memory 108. The memory 108 may be part of a system memory, and can be implemented using dynamic random access memories (DRAMs), synchronous DRAMs (SDRAMs), high bandwidth memories (HBMs), among other examples.

The MMU 104 may include a translation look aside buffer (TLB) 112 to cache recently used translations between the VAs to the PAs. If a translation is not found in the TLB 112, the MMU 104 may access the translation tables 116 to find the corresponding translation. For example, a page table walker 114 may perform a page table walk of the translation tables 116 and identify a page table entry that includes the translation of the given VA to the PA. The caches 106 may be used to store recently used data. Thus, the MMU 104 may also provide translations to access the caches 106. The translation tables 116 may include multiple translation tables that can be implemented using an in-memory tree data structure, as described with reference to FIG. 2.

Figure 2:
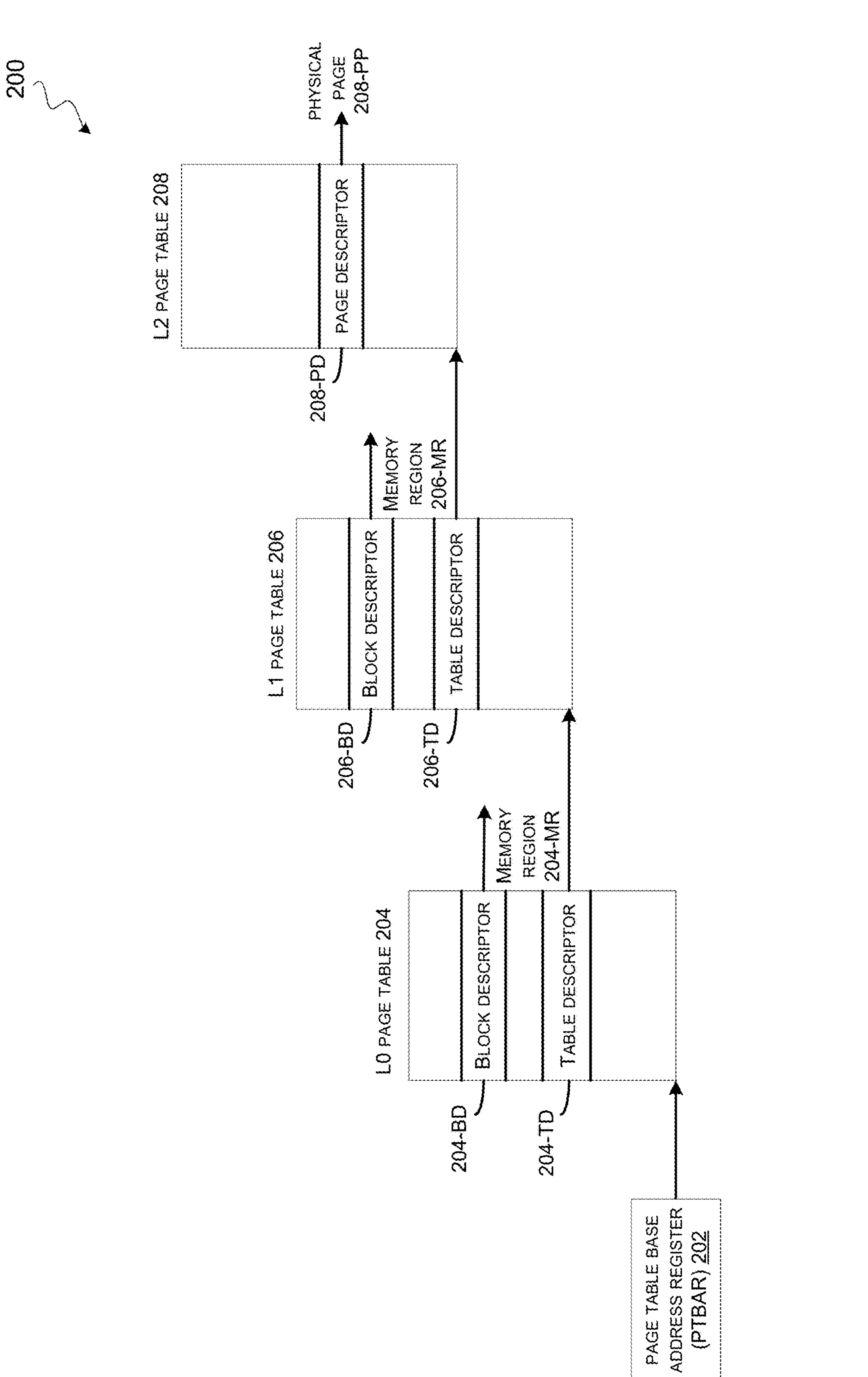
FIG. 2 illustrates an example page table mapping to access a physical page by doing a page table walk of multiple page tables.

FIG. 2 illustrates an example page table mapping 200 that can be used to access a physical page by doing a page table walk of multiple page tables.

The page table mapping 200 can be part of an in-memory tree data structure implemented as multiple levels of translation page tables that can be accessed to map a VA to a PA. The multiple levels of translation page tables may include a level 0 (L0) page table 204, a level 1 (L1) page table 206, and a level 2 (L2) page table 208, etc. In some examples, the L0 page table 204, the L1 page table 206, and the L2 page table 208 can be part of the translation tables 116 stored in the memory 108. Each page table may include page table entries (PTEs) that can store descriptors pointing to the next level of translation, which may include another page table, a memory region or a block in the physical memory (e.g., memory 108), or a physical memory page. Each PTE can be indexed using portions of the VA. A page table base address register (PTBAR) 202 may store a pointer that points to the base of the L0 page table 204. As an example, the PTBAR 202 can be similar to a translation table base register (TTBR) in ARM architecture.

The L0 page table 204 may include PTEs that can store a block descriptor 204-BD that points to a memory region 204-MR in the memory 108, and a table descriptor 204-TD that points to the L1 page table 206. The L1 page table 206 may include PTEs that can store a block descriptor 206-BD that points to another memory region 206-MR in the memory 108, and a table descriptor 206-TD that points to the L2 page table 208. The L2 page table 204 may include a page descriptor 208-PD that points to a physical page 208-PP in the memory 108. Thus, the mapping of a VA to the physical page 208-PP can be determined by performing a page table walk of the L0 page table 204, L1 page table 206, and the L2 page table 208 via the table descriptor 204-TD, the table descriptor 206-TD, and the page descriptor 208-PD. Thus, in this example, the mapping from a given VA to the physical page 208-PP can take up to 3 levels of translations. Furthermore, the page table walk may involve performing multiple load operations to load the corresponding descriptors as each level of translation is resolved.

Referring back to FIG. 1, in some systems, the software components 110 may be separated in a layered design by different execution privilege levels for security reasons. For example, the hypervisor or the operating system may be implemented as a trusted core component that can service a larger untrusted component. The computing system 100 can provide hardware support to execute the trusted core component at a higher privilege level than the untrusted component. The layered separation can ensure that only the core is trusted for the overall security of the system. This is further described with reference to FIG. 3.

Figure 3:
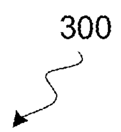
FIG. 3 illustrates privilege levels for different software components executing on a processor.
Figure 3:
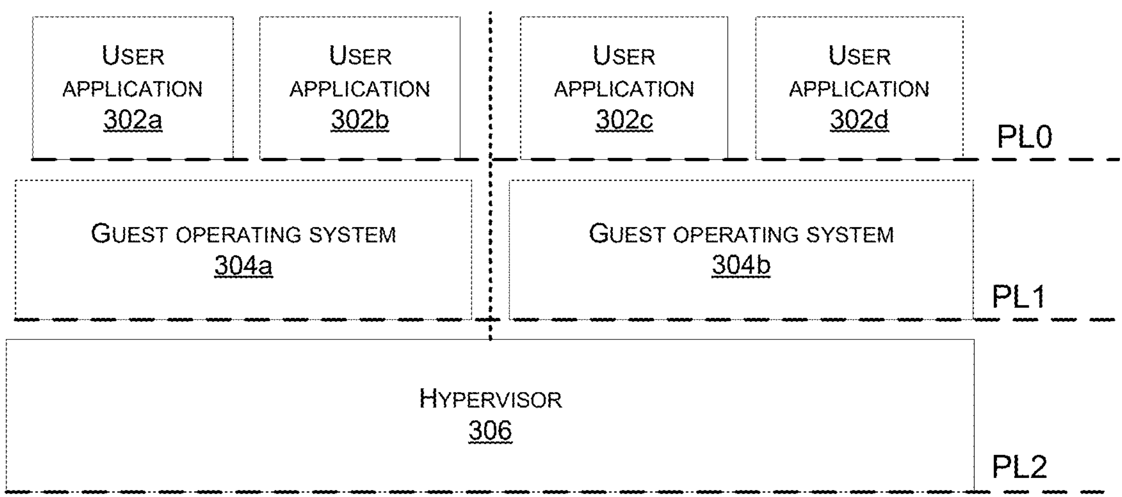

FIG. 3 illustrates privilege levels 300 for different software components executing on a processor in a layered design.

As shown in FIG. 3, user applications 302*a*, 302*b*, 302*c*, and 302*d* may have the lowest execution privilege, and, therefore, may be executed at the lowest or unprivileged level (e.g., PL0). Guest operating systems 304*a* and 304*b* may have higher privileges than the user applications 302*a*-302*d*, and may be executed at a first privilege level (e.g., PL1). A hypervisor 306 may have higher privileges than the guest operating systems 304*a*-304*b*, and may be executed at a second privilege level (e.g., PL2). In some computing systems, another software component may have the highest privileges over all the other software components (e.g., a secure monitor in the ARM based systems). When the processor 102 is in execution state, it can switch between adjacent privilege levels when entering an exception or exiting from an exception, or stay in the current privilege level. In some cases, the processor 102 can only switch to the next higher privilege level when taking an exception, or switch to the next lower privilege level when returning from an exception.

In some examples, allocation/de-allocation of resources may involve ownership transfer between different software components with adjacent privilege levels. For example, when a lower privileged software component requests to access a block of memory for a virtual machine (VM), the request needs to go through the higher privileged software component to check access permissions for security reasons. In some examples, the hypervisor 306 may be responsible to open, execute, and close VMs, as well as protect the data associated with the VMs. For example, the hypervisor 306 may allocate resources to a VM when starting the VM, and also take the resource away when closing down the VM. In another example, the hypervisor 306 may need additional memory resources for memory management or load balancing, and may request a VM to give some memory resources back if not being used by the VM.

Some systems may maintain two separate page table mappings for different privilege levels. In some implementations, both the mappings can be compatible, e.g., both contain identical mappings, or use the same fixed offset. However, in such systems, ownership transfer between adjacent privilege levels may require a page table walk of both the source page tables and the destination page tables, which can be costly in space as well as performance. This is described with reference to FIG. 4.

Figure 4:
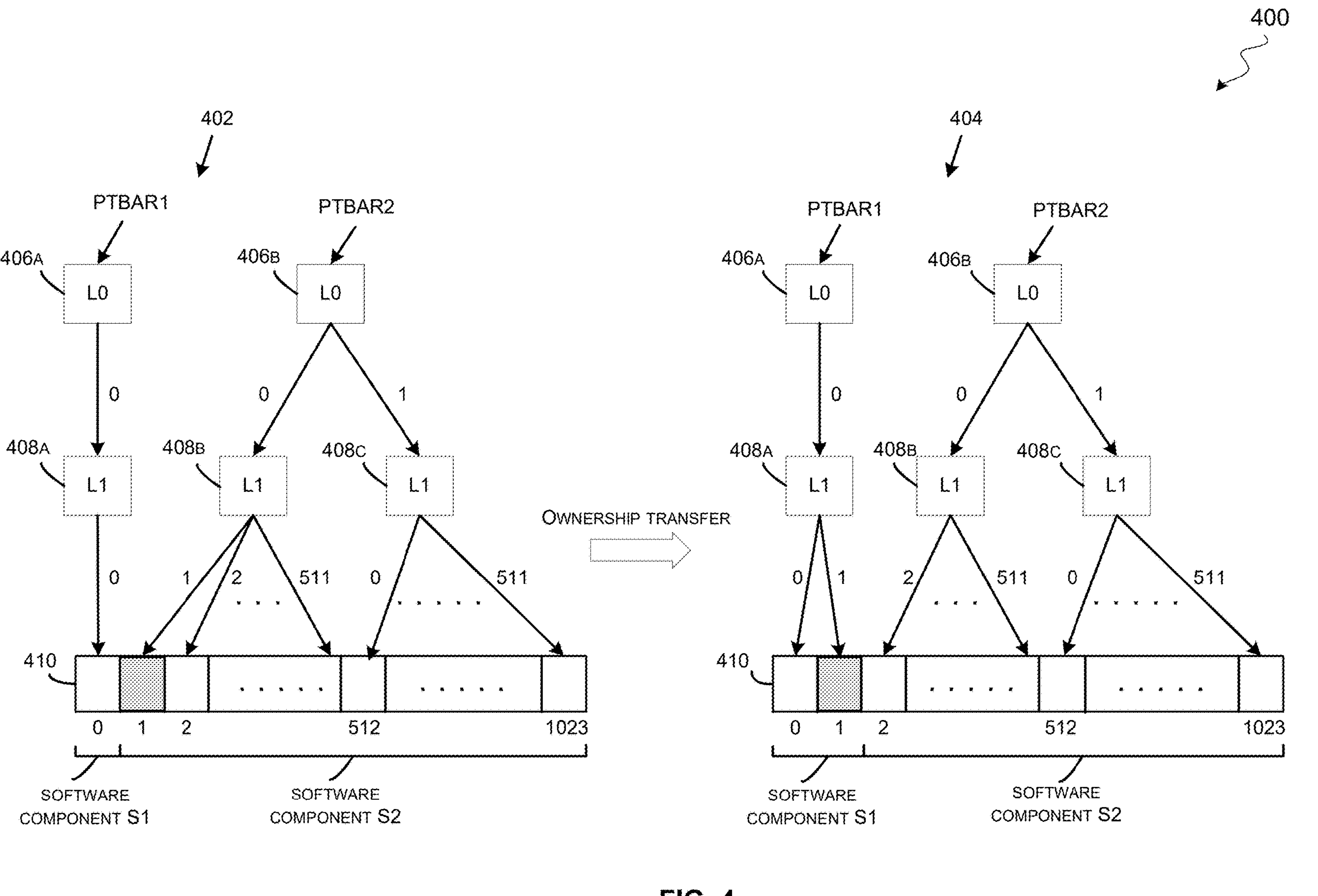
FIG. 4 illustrates an example of ownership transfer between two software components using independent page table mappings.

FIG. 4 illustrates an example of ownership transfer 400 between two software components using independent page table mappings. The two software components may include a first software component (e.g., a software component S1) with a higher execution privilege level and a second software component (e.g., a software component S2) with a next lower execution privilege level. For example, the software component S1 can be the hypervisor 306 and the software component S2 can be the guest operating system 304*a* or 304*b*.

In some implementations, the more privileged software component has to maintain two independent page table mappings for both the software components 1 and 2 to provide translations from a given VA to a corresponding PA 410 to access corresponding regions of the memory 108. For example, the memory 108 may include 1024 gigabytes (GBs) of physical memory that can be allocated to the different software components. As an example, the software component S1 may be allocated $0^{th}$ GB of the physical memory, and the software component S2 may be allocated $1^{st}$-$1023^{rd}$ GBs of physical memory. Thus, the page table mappings may include two independent page tables used by independent software components, which are effectively split using corresponding PA spaces. A page table walk of the respective page table mappings may be performed by each software component to access the corresponding memory region within the 1024 GBs, given a VA. Note that FIG. 4 shows only two levels of translations (e.g., L0 and L1) for ease of discussion, but some other examples may include higher or lower numbers of translation levels. In some implementations, higher levels of translations can allow memory accesses at a finer granularity level, e.g., in megabytes (MBs) or kilobytes (KBs).

As shown in FIG. 4, a PTBAR1 may point to the base of a page table that defines the address space of the software component S1, and a PTBAR2 may point to the base of a page table that defines the address space of the software component S2. In some implementations, the PTBAR2 can be a virtual PTBAR2 (VPTBAR2) that is configured by the software component S1 with the higher execution privilege level, which can provide another stage of translation for the software component S2 in a nested virtualization. For example, the software component S2 may manage its own distinct PTBAR for a first stage of translation before that of the virtual PTBAR2.

Prior to the ownership transfer, as shown in a page table mapping 402, the software component S1 may access the $0^{th}$ GB of the memory 108 via the corresponding PA 410 as a result of a page table walk (e.g., by the page table walker 114) of L0 406*a* and L1 408*a* translation tables corresponding to a page table rooted at PTBAR1. For example, the PTBAR1 may include a pointer to a PTE at an index 0 in the L0 page table 406*a*. The PTE in the L0 page table 406*a* may also include a pointer at an index 0 that points to the L1 page table 408*a*. The PTE in the L1 page table 408*a* may also be at an index 0 that includes the mapping to the PA 410 to access the $0^{th}$ GB of physical memory.

Similarly, the software component S2 may access the $1^{st}$-$1023^{rd}$ GBs of the memory 108 via the corresponding PA 410 as a result of a page table walk (e.g., by the page table walker 114) of L0 406*b* and L1 408*b* translation tables corresponding to a page table rooted at PTBAR2. For example, the PTBAR2 may include a pointer to a PTE at an index 0 in the L0 page table 406*b*. The PTE in the L0 page table 406*b* may include a pointer at an index 0 that points to the L1 page table 408*b*, and another pointer at an index 1 that points to a L1 page table 408*c*. The PTEs in the L1 page table 408*b* at indices 1, 2, . . . , 511 may include the mappings to the corresponding PAs 410 to access the allocated $1^{st}$-$511^{th}$ GBs of the memory 108. The PTEs in the L1 page table 408*c* at indices 0, 1, . . . , 511 may include the mappings to the corresponding PAs 410 to access the allocated $512^{nd}$-$1023^{rd}$ GBs of the physical memory.

To transfer ownership of a physical page or a memory block (e.g., to allocate or de-allocate memory resources), page table walks have to be performed to take away resources from one software component and give those resources to the other software component. For example, a PTE that maps to the PA corresponding to a memory block or a physical page to be transferred is first invalidated in the source page table, and a corresponding TLB entry is flushed. Next, another page table walk of the destination page table has to be performed to insert a new PTE in the destination page table mapping to transfer the ownership.

As an example, ownership transfer of the $1^{st}$ GB from the software component S2 to the software component S1 may involve doing a page table walk through the L0 page table 406*b* and the L1 page table 408*b* in the page table mapping 402 to invalidate the PTE in the L1 page table 408*b* at the index 1 that points to the PA 410 mapped to the shaded $1^{st}$ GB of the memory 108. The page table walk may involve multiple load operations to load the appropriate descriptors for the PTEs, and invalidating the PTE corresponding to the physical page may involve performing a write operation. In some cases, a TLB invalidate sequence may need to be performed to flush the corresponding cached translations in the TLB for that PTE, which may require additional write operations.

Next, the new PTE has to be inserted in the destination page table as shown by a page table mapping 404 on the right side of the ownership transfer arrow. For example, the software component S1 may perform a page table walk through the L0 page table 406*a* and the L1 page table 408*a* to insert a new PTE in the L1 page table 408*a* at an index 1 that points to the PA 410 mapped to the shaded $1^{st}$ GB of the memory 108. This page table walk may also involve multiple load operations to load the appropriate PTEs, and inserting the new PTE may include another write operation to create a valid PTE in the L1 page table 408*a*.

Thus, as described with reference to independent page table mappings for the software components 1 and 2, the ownership transfer may involve multiple load operations and write operations, which can incur space cost, as well as performance cost when the mappings need to be updated. In some instances, system performance may be impacted when the ownership transfers happen frequently, e.g., when multiple VMs are opened and closed, or resources need to be reallocated for security or load management purposes. It should be noted that the physical memory allocated to each component need not be contiguous, and the physical memory block(s) allocated to a particular component and subject to transfer can be located anywhere in the allocatable space of the physical memory. The techniques described herein can be used to utilize the same page table mapping for both the software components having adjacent privilege levels using an ownership indicator in the PTEs. This is further described with reference to FIG. 5.

Figure 5:
FIG. 5 illustrates an example of a descriptor for a page table entry comprising an ownership indicator, according to some embodiments.

FIG. 5 illustrates an example of a descriptor 500 for a PTE comprising an ownership indicator, according to some embodiments. The descriptor 500 can be a block descriptor like the block descriptors 204-BD or 206-BD, or a page descriptor like the page descriptor 208-PD.

The descriptor 500 may include attribute bits 500*a*, ownership indicator 500*b*, an address 500*c*, and other relevant fields that are not shown for ease of discussion. The attribute bits 500*a* may correspond to memory attributes related to security, access permissions, etc. The address 500*c* may include the physical address of the memory being mapped by the PTE. The ownership indicator 500*b* may include one or more bits to indicate the ownership of the physical memory by one or more software components at the physical address being mapped using the descriptor 500. In some implementations, the ownership indicator 500*b* may include a single bit to indicate an exclusive ownership of either the software component S1 or the software component S2. In some other implementations, the ownership indicator 500*b* may include more than one bits (e.g., one bit per privilege level) to indicate an exclusive ownership when only one of the bits is set or a shared ownership when multiple bits are set. Other implementations are also possible without deviating from the scope of the disclosure.

In some implementations, the ownership indicator 500*b* may be associated with a privilege level. For example, the ownership indicator 500*b* may include a first bit associated with a higher privilege level, and another bit associated with a next lower privilege level. For example, for ARM architecture, the first bit of the ownership indicator 500*b* can correspond to EL2, and the second bit of the ownership indicator 500*b* can correspond to EL1. Some embodiments can be used to allow independent permissions and memory attributes for each privilege level in the case of shared memory pages or blocks. The higher privileged software layer can update the ownership bits to change the ownership of a physical page from a current privilege level to a next lower privilege level, or from a lower privilege level to the next higher privilege level. Having the ownership indicator bits in the PTE can allow the use of a single shared page table mapping for the ownership transfer as described with reference to FIG. 6.

Figure 6:
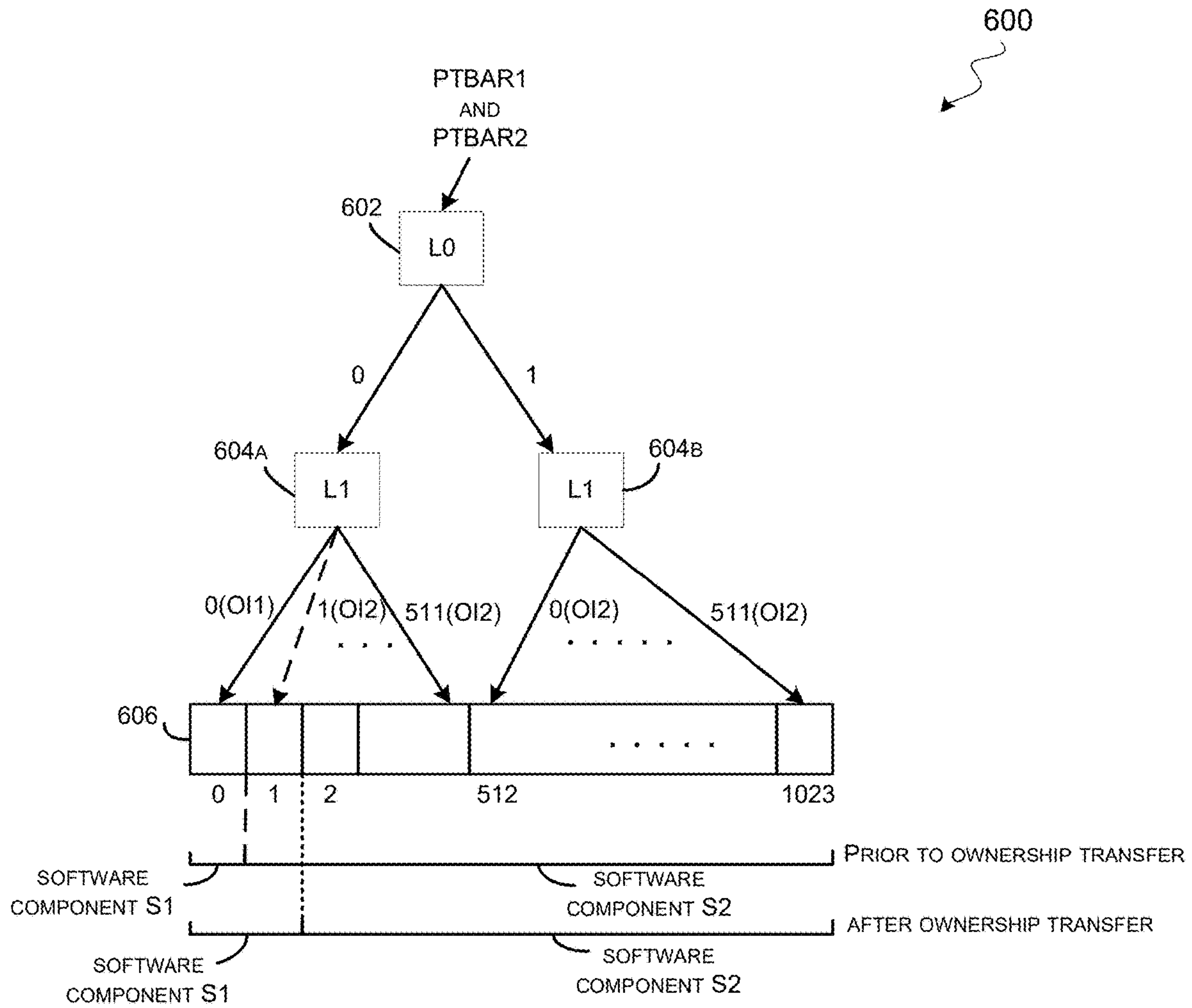
FIG. 6 illustrates an example of ownership transfer between two software components using the same page table mapping based on an ownership indicator in the page table entry, according to some embodiments.

FIG. 6 illustrates an example of ownership transfer between two software components using a page table mapping 600 based on an ownership indicator in the PTE, according to some embodiments. The ownership indicator can be the ownership indicator 500*b* in the descriptor 500.

The page table mapping 600 may include translation page tables that are shared by the software component S1 and the software component S2, and can be used to allow access to the physical memory blocks or pages in the memory 108 that are owned by the software component S1 and/or the software component S2 using the ownership indicator in the PTEs of the page tables at the last translation level. As shown in FIG. 6, the PTBAR1 for the software component S1 and the PTBAR2 for the software component S2 can both point to an L0 page table 602. As discussed previously, in some implementations, the PTBAR2 can be a virtual PTBAR that is managed by the higher privileged software component. The L0 page table 602 may include a PTE at an index 0 that points to a L1 page table 604*a*, and another PTE at an index 1 that points to a L1 page table 604*b*. The L1 page table 604*a* and the L1 page table 604*b* may include PTEs that point to corresponding PAs 606 that map to blocks/pages of the physical memory owned by the software component S1 and/or the software component S2.

According to some embodiments, the L1 page table 604*a* and the L1 page table 604*b* being at the last translation level, each PTE in the L1 page table 604*a* and the L1 page table 604*b* may include an ownership indicator (OI) to indicate the ownership of the physical page. In some implementations, the ownership indicator may be represented using one or more available bits in the descriptor for the PTE. For example, an OI1 bit may be used to indicate ownership by the software component S1, and an OI2 bit may be used to indicate ownership by the software component S2. The OIL and OI2 bits can be part of the ownership indicator 500*b*. When the OI1 bit is enabled (e.g., set to 1) and the OI2 bit is disabled (e.g., set to 0), the PTE may indicate ownership of the physical page by the software component S1, when the OI1 bit is disabled and the OI2 bit is enabled, the PTE may indicate ownership of the physical page by the software component S2, and when both the OI1 bit and the OI2 bit are enabled, the PTE may indicate ownership of the physical page by both the software components 1 and 2.

Referring back to FIG. 4, as described with reference to the page table mapping 402 before the ownership transfer, the $0^{th}$ GB was owned by the software component S1 and the 1st $1023^{rd}$ GBs were owned by the software component S2. Thus, in some embodiments, the PTE at an index 0 in the L1 page table 604*a* may include the OI1 bit enabled (and OI2 bit disabled) indicating the ownership of the $0^{th}$ GB by the software component S1, and remaining PTEs at indices 1, 2, . . . , 511 may include a respective OI2 bit enabled (and OI1 bit disabled) indicating the ownership of the $1^{st}$-$511^{th}$ GBs by the software component S2. Similarly, the PTE at an index 0 in the L1 page table 604*b* may include a respective OI2 bit enabled (and OI1 bit disabled) indicating the ownership of the $512^{nd}$-$1023^{rd}$ GBs by the software component S2.

According to some embodiments, a single page table walk may be performed through the page table mapping 600 to transfer the ownership of the $1^{st}$ GB of the memory from the software component S1 to the software component S2 by updating the OIL and OI2 bits in the PTE of the L1 page table 604*a*. For example, prior to the ownership transfer, the OI2 bit in the PTE of the L1 page table 604*a* at the index 1 may be enabled (e.g., set to 1) indicating ownership by the software component S2. To transfer the ownership, the OI2 bit in the PTE of the L1 page table 604*a* at the index 1 can be updated to "0" and the OI1 bit in the PTE of the L1 page table 604*a* at the index 1 can be updated to "1" indicating ownership by the software component S1. Thus, the ownership transfer can be performed by updating the OIL and OI2 bits while doing the single page table walk of the page table mapping 600, instead of two separate page table walks as described with reference to FIG. 4. In some cases, a TLB invalidate sequence may be performed to invalidate a TLB entry corresponding to the PTE of the L1 page table 604*a* at the index 1 based on the changed ownership.

Some embodiments can be used to enforce a strong security property when no sharing between the software components 1 and 2 is allowed by ensuring that the OIL and OI2 bits are indicating only a single owner for memory accesses, e.g., only one of the OIL or OI2 bits is enabled at a time. In such cases, if both the OIL and OI2 bits are set, an alert for an error or a fault can be generated when performing the ownership transfer to indicate to the processors 102 that the physical page is owned by more than one software component, which can provide an extra layer of security. In some embodiments, when only exclusive ownership by each software component is allowed, a single OI bit can be used instead of separate OI1 and OI2 bits. For example, the ownership indicator 500*b* can be set to "1" to indicate ownership by the software component S1, or set to "0" to indicate ownership by the software component S2.

Thus, as compared to page table mapping 404, the total number of load operations and the write operations using the single page table mapping 600 to insert a new PTE and invalidate the existing PTE can be significantly reduced, which can improve the memory space usage as well as the system performance.

Figure 7:
FIG. 7 illustrates a flowchart for an example of a method to perform ownership transfer between two software components using an ownership indicator in the page table entry, according to some embodiments.
Figure 7:
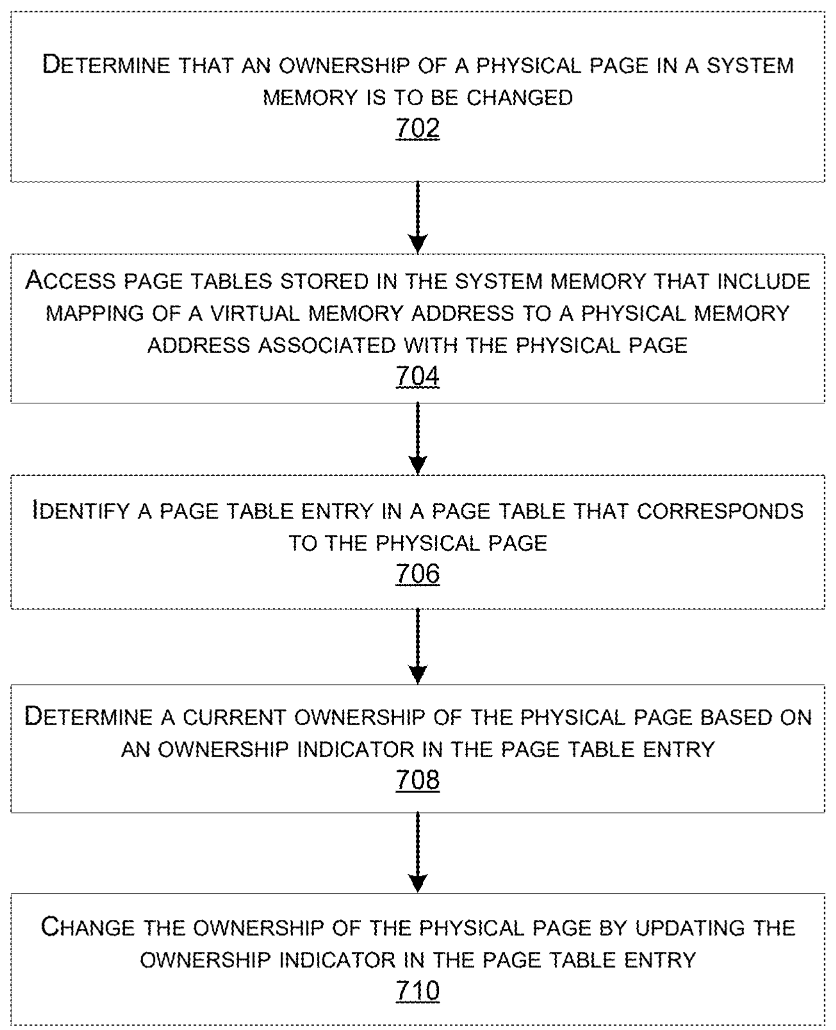

FIG. 7 illustrates a flowchart 700 for an example of a method to perform ownership transfer between two software components using an ownership indicator in the PTE, according to some embodiments. In some examples, the method can be performed to transfer ownership between two software components executing on the processors 102, by the software component having higher privileges than the other software component. For example, the software components can be the guest operating system 304*a* or 304*b*, or the hypervisor 306, and the method can be performed by the hypervisor 306.

In step 702, the method includes determining that an ownership of a physical page in a system memory is to be changed. For example, the two software components may include a software component S1 having higher execution privileges, and a software component S2 having next lower execution privileges in a layered design. The software component S1 with the higher execution privileges (e.g., the hypervisor 306) may determine that the ownership of a physical page in the memory 108 is to be changed (e.g., to allocate or de-allocate memory resources). The physical page can correspond to the 1$^{st}$ GB of the memory as described with reference to FIG. 6.

In step 704, the method further includes accessing page tables stored in the system memory that include mapping of a virtual memory address to a physical memory address associated with the physical page. The software component S1 may determine a mapping of the VA to a PA associated with the physical page does not exist in the TLB 112, and therefore, a page table walk of the translation tables 116 may be performed to determine the mapping of the VA to the PA. For example, the translation tables 116 may include the page table mapping 600, and a page table walk of the L0 page table 602 and the L1 page table 604*a*/L1 page table 604*b* may be performed to determine the PA from the VA. Each PTE in the L1 page table 604*a*/L1 page table 604*b* may include a respective descriptor with an ownership indicator like the descriptor 500.

In step 706, the method further includes identifying a page table entry in a page table that corresponds to the physical page. The software component S1 may identify the PTE at the index 1 in the L1 page table 604*a* that corresponds to the physical page mapped to the 1$^{st}$ GB of the memory.

In step 708, the method further includes determining a current ownership of the physical page based on an ownership indicator in the page table entry. The software component S1 may determine the current ownership of the physical page based on the OIL and OI2 bits in the PTE at the index 1. For example, the OI1 bit may be disabled and the OI2 bit may be enabled to indicate the ownership of the 1$^{st}$ GB by the software component S2.

In step 710, the method further includes changing the ownership of the physical page by updating the ownership indicator in the page table entry. The software component S1 may update the ownership indicator 500*b* in the PTE at the index 1 to enable the OI1 bit and disable the OI2 bit to change the ownership of the 1$^{st}$ GB of memory. In some implementations, the software component S1 may update the OIL and OI2 bits in the PTE using an atomic operation (e.g., read-modify-write sequence). The software component S1 may also invalidate a TLB entry corresponding to the PTE based on the changed ownership. In some implementations, additional security checks can be performed, and an alert can be generated to indicate ownership of the physical page by more than one software component if both the OIL and OI2 bits are set in the PTE. In some implementations, the above described method or some of the steps in the method can be performed in hardware, e.g., as part of the MMU 104, to perform the ownership transfer.

Figure 8:
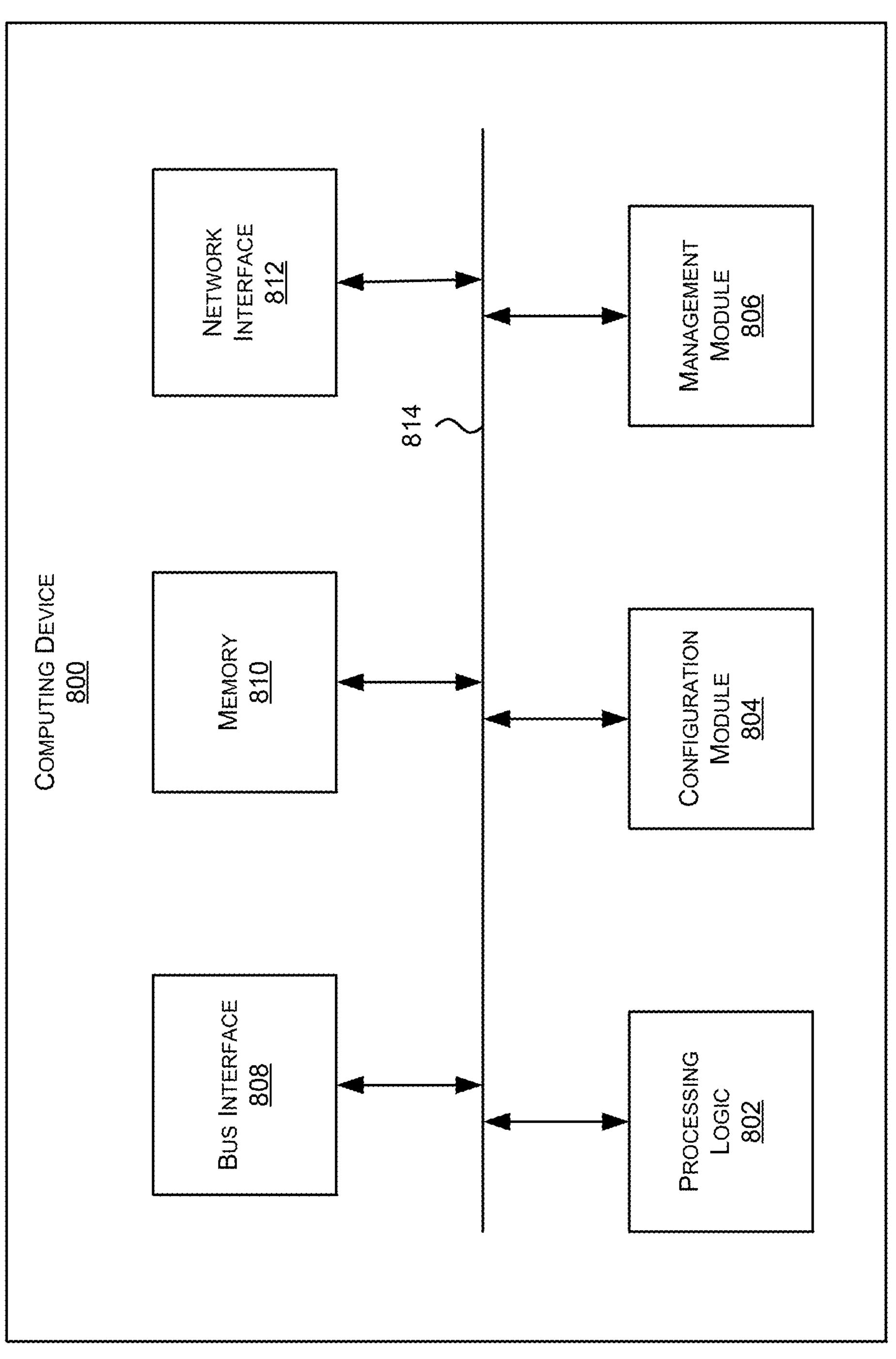
FIG. 8 illustrates an example of a computing device, according to certain aspects of the disclosure.

FIG. 8 illustrates an example of a computing device 800. Functionality and/or several components of the computing device 800 may be used without limitation with other embodiments disclosed elsewhere in this disclosure, without limitations. For example, the computing system 100 may be part of the computing device 800. A computing device 800 may facilitate processing of packets and/or forwarding of packets from the computing device 800 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computing device 800 may be the recipient and/or generator of packets. In some implementations, the computing device 800 may modify the contents of the packet before forwarding the packet to another device. The computing device 800 may be a peripheral device coupled to another computer device, a switch, a router or any other suitable device enabled for receiving and forwarding packets.

In one example, the computing device 800 may include processing logic 802, a configuration module 804, a management module 806, a bus interface module 808, memory 810, and a network interface module 812. These modules may be hardware modules, software modules, or a combination of hardware and software. In certain instances, modules may be interchangeably used with components or engines, without deviating from the scope of the disclosure. The computing device 800 may include additional modules, which are not illustrated here. In some implementations, the computing device 800 may include fewer modules. In some implementations, one or more of the modules may be combined into one module. One or more of the modules may be in communication with each other over a communication channel 814. The communication channel 814 may include one or more busses, meshes, matrices, fabrics, a combination of these communication channels, or some other suitable communication channel.

The processing logic 802 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 802 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 810.

The memory 810 may include either volatile or non-volatile, or both volatile and non-volatile types of memory. The memory 810 may, for example, include random access memory (RAM), read only memory (ROM), Electrically Erasable Programmable Read-Only Memory (EEPROM), flash memory, and/or some other suitable storage media. In some cases, some or all of the memory 810 may be internal to the computing device 800, while in other cases some or all of the memory may be external to the computing device 800. The memory 810 may store an operating system comprising executable instructions that, when executed by the processing logic 802, provides the execution environment for executing instructions providing networking functionality for the computing device 800. The memory may also store and maintain several data structures and routing tables for facilitating the functionality of the computing device 800.

In some implementations, the configuration module 804 may include one or more configuration registers. Configuration registers may control the operations of the computing device 800. In some implementations, one or more bits in the configuration register can represent certain capabilities of the computing device 800. Configuration registers may be programmed by instructions executing in the processing logic 802, and/or by an external entity, such as a host device, an operating system executing on a host device, and/or a remote device. The configuration module 804 may further include hardware and/or software that control the operations of the computing device 800.

In some implementations, the management module 806 may be configured to manage different components of the computing device 800. In some cases, the management module 806 may configure one or more bits in one or more configuration registers at power up, to enable or disable certain capabilities of the computing device 800. In certain implementations, the management module 806 may use processing resources from the processing logic 802. In other implementations, the management module 806 may have processing logic similar to the processing logic 802, but segmented away or implemented on a different power plane than the processing logic 802.

The bus interface module 808 may enable communication with external entities, such as a host device and/or other components in a computing system, over an external communication medium. The bus interface module 808 may include a physical interface for connecting to a cable, socket, port, or other connection to the external communication medium. The bus interface module 808 may further include hardware and/or software to manage incoming and outgoing transactions. The bus interface module 808 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 808 may include the physical layer for any of these bus protocols, including a connector, power management, and error handling, among other things. In some implementations, the computing device 800 may include multiple bus interface modules for communicating with multiple external entities. These multiple bus interface modules may implement the same local bus protocol, different local bus protocols, or a combination of the same and different bus protocols.

The network interface module 812 may include hardware and/or software for communicating with a network. This network interface module 812 may, for example, include physical connectors or physical ports for wired connection to a network, and/or antennas for wireless communication to a network. The network interface module 812 may further include hardware and/or software configured to implement a network protocol stack. The network interface module 812 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 800 may include multiple network interface modules, each configured to communicate with a different network. For example, in these implementations, the computing device 800 may include a network interface module for communicating with a wired Ethernet network, a wireless 802.11 network, a cellular network, an Infiniband network, etc.

The various components and modules of the computing device 800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, FIG. $$$, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms “a” and “an” and “the” and similar referents in the context of describing the disclosed embodiments (especially in the context of the following claims) are to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. The term “connected” is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase “at least one of X, Y, or Z,” unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method comprising:

storing, in system memory, a set of page tables with mappings of virtual memory addresses to physical memory addresses associated with physical pages over multiple translation levels, wherein a first page table base address of a first software component points to a lowest level page table in the set of page tables, and a second page table base address of a second software component points to the lowest level page table in the set of page tables, wherein the lowest level page table is shared between the second software component and the first software component, the first software component having a higher execution privilege level than the second software component;

determining that an ownership transfer of a physical page in the system memory from the first software component to the second software component is to be performed;

performing a page table walk of the set of page tables to determine a mapping of a virtual memory address to a physical memory address associated with the physical page, each page table in the set of page tables comprising page table entries for a corresponding translation level;

identifying a page table entry for a last translation level that corresponds to the physical page, the page table entry comprising a first ownership indicator bit to indicate ownership by the first software component and a second ownership indicator bit to indicate ownership by the second software component;

determining that the physical page is owned by the first software component based on the first ownership indicator bit being enabled and the second ownership indicator bit being disabled in the page table entry; and performing the ownership transfer of the physical page from the first software component to the second software component by updating the page table entry to disable the first ownership indicator bit and to enable the second ownership indicator bit.

2. The method of claim 1, wherein the ownership transfer is performed by the first software component having the higher execution privilege level than the second software component having a next lower execution privilege level in a layered design.

3. The method of claim 2, wherein the first software component with the higher execution privilege level is associated with a hypervisor and the second software component with the next lower execution privilege level is associated with a guest operating system.

4. The method of claim 1, further comprising:

determining that the first ownership indicator bit and the second ownership indicator bit are both enabled when performing the ownership transfer; and generating an alert to indicate ownership of the physical page by more than one software component.

5. A method, comprising:

determining that an ownership of a physical page in a system memory is to be changed from a first software component to a second software component, wherein a first page table base address of the first software component points to a lowest level page table, and a second page table base address of the second software component points to the lowest level page table;

starting from the lowest level page table, accessing page tables stored in the system memory that provide a mapping of a virtual memory address to a physical memory address associated with the physical page, wherein the lowest level page table is shared between the first software component and the second software component, the first and second software components having different execution privilege levels;

identifying a page table entry in a highest level page table that corresponds to the physical page;

determining a current ownership of the physical page based on an ownership indicator in the page table entry; and changing the ownership of the physical page by updating the ownership indicator in the page table entry.

6. The method of claim 5, wherein accessing the page tables includes performing a single page table walk of the page tables comprising multiple levels of translations.

7. The method of claim 6, wherein the page tables include at least three levels of translations.

8. The method of claim 5, wherein the current ownership belongs to the first software component having lower execution privileges than the second software component that the ownership is being changed to.

9. The method of claim 5, wherein the current ownership belongs to the first software component having higher execution privileges than the second software component that the ownership is being changed to.

10. The method of claim 9, wherein the first software component is a hypervisor, and the second software component is a guest operating system, and the change in the ownership is performed to allocate resources to a virtual machine executing on the guest operating system.

11. The method of claim 9, wherein changing the ownership is performed by the first software component having the higher execution privileges.

12. The method of claim 5, wherein in addition to the lowest level page table, higher level page tables are also shared between the first software component and the second software component, the first and second software components having different execution privilege levels.

13. The method of claim 12, wherein the ownership indicator includes a first ownership bit to indicate the ownership of the physical page by the first software component, and a second ownership bit to indicate the ownership of the physical page by the second software component.

14. The method of claim 13, wherein both the first ownership bit and the second ownership bit being enabled in the page table entry indicates that both the first software component and the second software component have access to the physical page.

15. The method of claim 5, further comprising:

invalidating a translation look-aside buffer (TLB) entry corresponding to the page table entry based on the changed ownership.

16. An apparatus comprising:

a processor configured to execute software components having different execution privilege levels; and a memory configured to store page tables including a lowest level page table shared between the software components having different execution privilege levels, the page tables storing mappings between virtual memory addresses and physical memory addresses over multiple translation levels, wherein a first page table base address of a first software component points to the lowest level page table, and a second page table base address of a second software component points to the lowest level page table, wherein each page table entry in a highest level page table for a last translation level includes an ownership indicator to indicate ownership of a corresponding physical page being mapped by a given page table entry, and wherein the first software component having higher execution privileges than the second software component is configured to:

determine that an ownership of a physical page in the memory is to be changed;

access the page tables stored in the memory to determine a mapping of a virtual memory address to a physical memory address associated with the physical page;

identify a page table entry in the highest level page table for the last translation level that corresponds to the physical page;

determine a current ownership of the physical page based on an ownership indicator in the page table entry; and change the ownership of the physical page by updating the ownership indicator in the page table entry.

17. The apparatus of claim 16, wherein the ownership of the physical page is changed from the first software component having the higher execution privileges to the second software component having next lower execution privileges.

18. The apparatus of claim 16, wherein updating the ownership indicator in the page table entry is performed using an atomic operation.

19. The apparatus of claim 16, wherein the ownership indicator includes one or more bits to indicate the current ownership of the physical page.

20. The apparatus of claim 16, wherein the first software component is further configured to:

invalidate a translation look-aside buffer (TLB) entry corresponding to the page table entry based on the changed ownership.

* * * * *